Dec. 19, 1933.  R. W. BURNETT  1,939,953
HOLDING AND RELEASING MECHANISM FOR HAND BRAKES
Filed May 28, 1928   4 Sheets-Sheet 1

Dec. 19, 1933.   R. W. BURNETT   1,939,953
HOLDING AND RELEASING MECHANISM FOR HAND BRAKES
Filed May 28, 1928   4 Sheets-Sheet 3

Inventor
Richard W. Burnett
By Barnett Tillman
Attorneys

Dec. 19, 1933. R. W. BURNETT 1,939,953
HOLDING AND RELEASING MECHANISM FOR HAND BRAKES
Filed May 28, 1928 4 Sheets-Sheet 4

Inventor
Richard W. Burnett
By Burnett & Truman
Attorneys

Patented Dec. 19, 1933

1,939,953

UNITED STATES PATENT OFFICE 1,939,953

HOLDING AND RELEASING MECHANISM FOR HAND BRAKES

Richard W. Burnett, Chicago, Ill.

Application May 28, 1928. Serial No. 281,088

36 Claims. (Cl. 188—81.1)

This invention relates to railway car hand brakes involving a vertically disposed hand wheel, a power shaft on which the hand wheel is supported together with various other devices operated thereby for taking up the slack in the brake rigging and for moving the brake shoes against the wheels of a car with pressure sufficient for retarding or stopping the car.

A principal object of the invention is to provide, in a railway car hand brake of the above character, means arranged back of the hand wheel for forcibly releasing the brake setting apparatus from its brake setting position, the arrangement being such that the brakeman can perform the necessary operations for setting the brakes or for releasing them with one hand thereby permitting the brakeman to use the other hand to maintain a safe position on the car, for example on the brake platform, by grasping the ladder rung, handhold, or other fixed structure of the car.

A more specific object is to provide, in a hand brake of the above character, an arrangement of holding and releasing mechanism which is so constructed and arranged with relation to the hand wheel that either a complete and instantaneous release of the brake may be effected with a single movement of a controlling element; or a step by step release involving successive engagements of a pawl or other holding device with a ratchet or other element with which it engages; or a graduated release under the control of the brakeman through manipulation of the handwheeel.

A further object is to provide a hand brake operated with a handwheel for rotating the brake setting mechanism and one or more tripping levers for releasing the brakes, all arranged vertically on the car wall, for example on the end of the car, which arrangement provides a maximum degree of safety and convenience in the setting and releasing of the brakes and allows a larger wheel to be used than is possible when the wheel is horizontal, so that there is an increase of leverage and power in setting the brakes and in holding them during what has been termed the graduated release.

A further object of the invention is to provide a holding and releasing mechanism for handbrake apparatus which will permit release of the brakes from the roof of the car or from the ground or lower part of the end ladder, as well as from the brake platform.

The application is a continuation in part of my copending application, Serial No. 10,248, filed February 19, 1925.

The present application is not concerned with nor limited to the particular type of winding mechanism shown in the pending application referred to nor to any particular arrangements at the bottom of the car for transmitting power to the brake rigging, by which latter term I mean the brakeshoes and connecting rods, levers and chains which are arranged under the deck of the car and which, for ordinary braking operations, are operated by air-pressure these combinations being claimed in my co-pending application, Serial No. 349,817, filed March 25, 1929. The handbrake apparatus, it will be understood, is used principally in switching cars, for example when the train is made up or when cars are cut off from the train and in holding the car or a train of cars on a siding.

By the term "chain" as used in the specification I intend to include any flexible element, such as a cable, capable of being wound on a drum or equivalent winding member; and the term "drum" is used in the broad sense, including any revoluble member on which the "chain" may be wound.

The invention is illustrated in certain preferred embodiments in the accompanying drawings in which.

Figure 1:
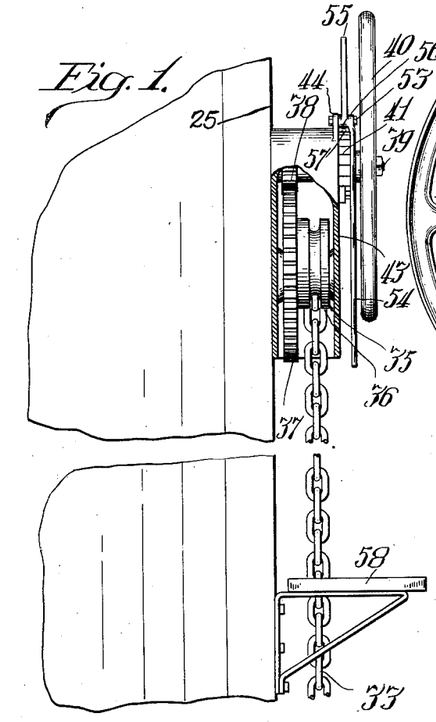
Fig. 1 is a fragmentary side elevation of the end of a railway box car illustrating one embodiment of my invention.
Figures 2, 3, 4:
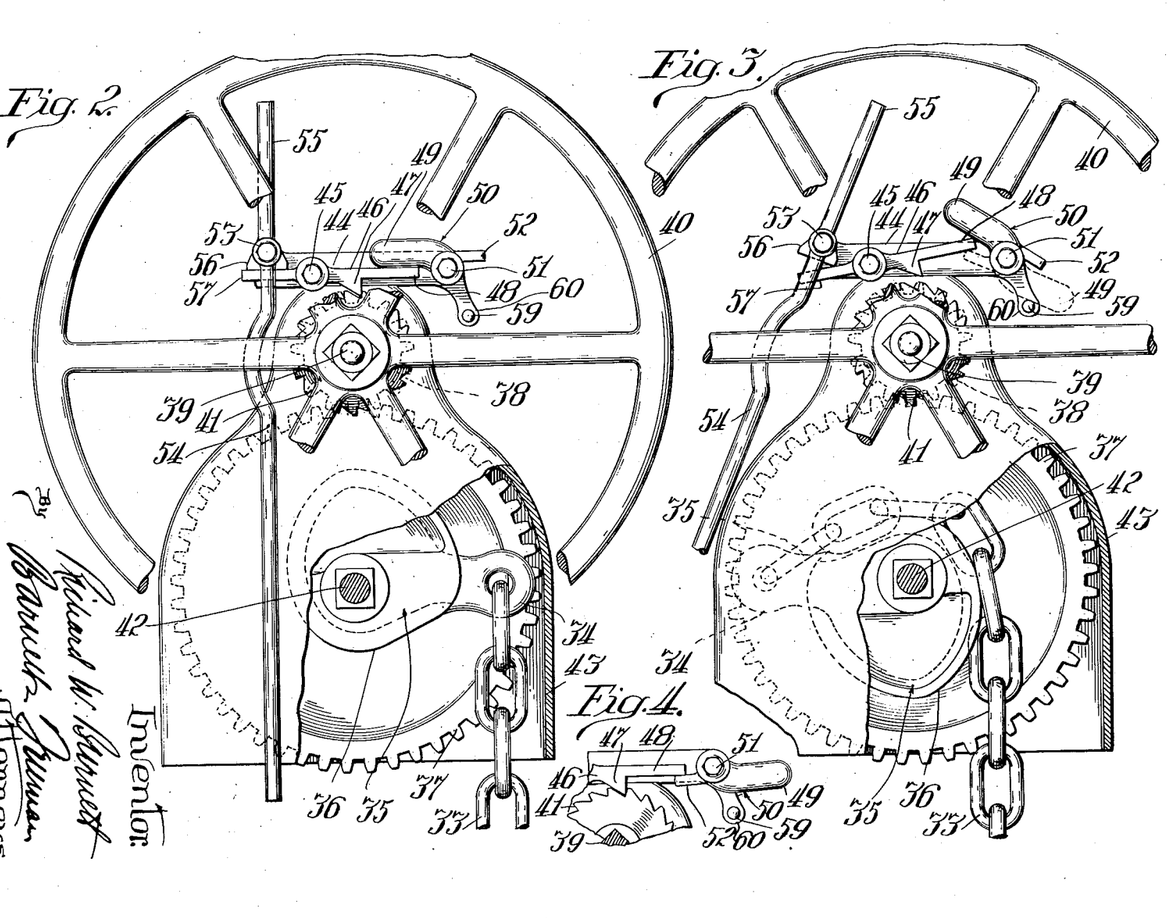
Fig. 2 is an end elevation, with parts in section, of the mechanism for winding the operating chain on its drum and for holding and releasing the drum.
Fig. 3 is a view similar to Fig. 2 illustrating the parts of this mechanism at the moment of release of the brakes by instantaneous operation.
Fig. 4 is a detail view showing the reversed position of the holding and tripping member.

Referring first to Figs. 1, 2 and 3: 25 designates the body of a railway box car and 33 a chain attached to an arm 34 of a winding drum 35, the preferably grooved winding surface 36 on which is preferably of such length that any slack in the brake rigging and in the handbrake apparatus may be taken up and the brakeshoes set with braking pressure against the wheels of the car by a movement of the drum 35 less than one revolution. That is, the center line of the winding surface is preferably in one plane and for any setting operation the chain does not have to wind upon itself. Rigidly connected with drum 35 is a relatively large gear wheel 37 with which is meshed a smaller gear wheel 38. Gear wheel 38 is fixed to a shaft 39 which is, preferably in rigid relation with a handwheel 40 and a ratchet wheel 41. The shaft 39 and the shaft 42 to which the winding drum and large gear 37 are fixed, are mounted in suitable bearings in a housing 43 secured to the end wall of the car, the housing enclosing the winding drum and gears while the ratchet wheel and pawl, the holding and tripping device and the operating rod, to be described, are on the outside of the housing.

On the upper end of housing 43 is a bracket 44 to which is pivoted at 45 a detent or pawl 46 having a tooth 47 to engage ratchet 41. The pawl 46 is formed with an extension 48 adapted to be engaged on its upper surface by the weighted end 49 of a tripping and holding member 50 pivoted back of the hand wheel at 51 to the bracket 44, and on its under surface by a tripping lug 52 formed on member 50.

Pivoted at 53 on the other end of bracket 44 is a pendant rod 54 of any suitable length. The rod operates in a plane back of the hand wheel and is preferably formed with an extension 55 above its pivotal point. Rod 54 is formed with a cam 56 arranged directly above, and preferably in contact with, the tail-piece 57 of pawl 46, that is, when the pawl is in engagement with ratchet wheel 41.

*Operation.*—(Figs. 1, 2 and 3) The brakes are set by a twirling movement in the clockwise direction of handwheel 40, the brakeman standing on the brake platform 58 shown in Fig. 1. A single whirling movement of the wheel, which can be accomplished with the right hand while the brakeman grasps a handhold, for example, with his left hand, will take up slack in the brake apparatus, ordinarily bringing the brakeshoes against the wheel with some braking pressure. During this movement ratchet wheel 41 turns under the pawl 46. The pawl rises over the successive teeth of the ratchet wheel, engagement of the pawl with the ratchet being insured by the bearing of the weighted end 49 of the tripping and holding member 50 on the extension 48 of the pawl. Assuming that the brakes have not been sufficiently set by this first movement of the handwheel, the brakeman takes another hold on the wheel with his right hand and by turning the wheel in the clockwise direction revolves the winding drum as far as may be necessary to create the desired braking pressure between the brakeshoes and wheels of the car.

The brakes may be released in three different ways depending upon the conditions confronting the brakeman.

To obtain an instantaneous release the operating lever or rod 54 is swung either to the right or left causing its cam 56 to force the tailpiece 57 of the pawl 46 downwardly so that the tooth 47 of the pawl is disengaged from the ratchet wheel 41. The rod 54 may be of such length above and below its pivot that the brakes can be released in this way either from ground, or from one of the lower rungs of the end ladder, or from the roof of the car, as well as from the brake platform the upper arm of the lever or rod preferably extending substantially to the rim of the hand wheel so that it may be operated from the latter position by reaching over the hand wheel. Although the braking force which the apparatus is capable of exerting may be very considerable, up to 3,000 or 4,000 pounds or more, the leverage exerted by the cam 56 is quite adequate to disengage the pawl from the ratchet wheel. The tension of the brake apparatus causes a quick reaction. The drum 35 is rotated immediately in the opposite direction and the brakeshoes are released from the wheels of the car. The weighted end 49 of the tripping and holding member 50 remains in contact with the extension 48 of the pawl so that as soon as the lever 54 is restored to its vertical position, to which it will move by gravity when released by the brakeman, the pawl will be returned to its operative relation with the ratchet wheel.

The brakeman may wish, however, to obtain a partial release only of the brakes. In that case lever 54 is given a quick movement first to the oblique position (Fig. 3) and then back to the vertical position. This will bring about a momentary disengagement of the pawl from the ratchet wheel followed by a re-engagement at the next tooth of the ratchet, say, or the next but one. In this case the weighted end 49 of the holding and tripping member 50 also remains against the extension 48 of the pawl.

To obtain what has been termed a graduated release, that is, a release of the brakes under the control of the brakeman, which may be desirable in drifting the car, the holding and tripping member 50 is turned so that its projection 52 bears against the extension 48 of the pawl. On account of the pressure between the pawl and ratchet the engagement of the pawl with the ratchet is not disturbed. However, as soon as the pressure between pawl and ratchet is relieved, by giving the handwheel 40 a slight movement of rotation in the brake-setting direction, the holding and tripping member 50 will bring about disengagement of the pawl from the ratchet, the weighted end 49 of member 50 coming to a stop, to limit the upward movement of the pawl, against a pin 59 on a depending projection 60 from the bracket 44. The braking pressure is now under control through manipulation of the handwheel. The brakeman may relieve the pressure by allowing the handwheel to turn in a counter-clockwise direction and, if necessary, he may again increase the pressure. He may, of course, obtain an instantaneous release by letting go the wheel.

It should be said that the holding and tripping device 50 can be used, if the apparatus were not provided with the lever 54, for effecting the instantaneous release. The tripping member 50 is on an axis remote from the pivotal axis of the pawl. The leverage which can be exerted against the pawl by means of the tripping device will be quite sufficient to force the pawl out of engagement with the ratchet, in the case of most braking pressures at least; but in any event by increasing the length of the weighted end 49 of the pawl any required leverage can be obtained.

Figure 5:
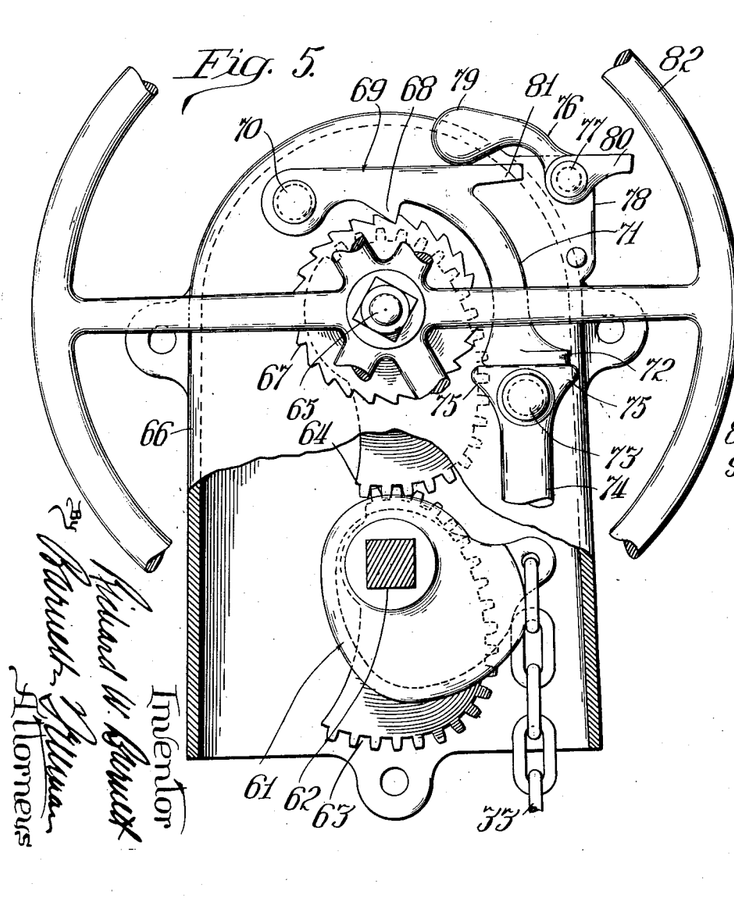
Fig. 5 is a view similar to Fig. 2, illustrating a modification.

In Fig. 5 the winding drum 61 is on the same shaft 62 with an eccentric gear 63 which latter meshes with an eccentric gear 64 on the handwheel shaft 65. On the shaft 65, outside the housing 66, is a ratchet wheel 67 engaged by the tooth 68 of a pawl 69 pivoted to the housing 66 at 70 and formed with an arcuate extension 71 terminating in a footpiece 72. Pivoted to the housing at 73, below the footpiece of the pawl, is an operating rod 74, which may be of any suitable length, having cam shoulders 75—75 adapted to engage the footpiece of pawl 69 and force the pawl out of engagement with ratchet 67. Operating rod 74 may be swung in either direction, right or left, to accomplish this result. A tripping member 76 is pivoted at 77 to a bracket 78 on the housing. The weighted end 79 of the tripping member normally bears against the upper surface of pawl 69. The holding and tripping member is formed with a tailpiece 80 adapted to engage the under side of a projection 81 on the pawl. The operation is substantially the same as in the case of the form of the invention shown in Figs. 1, 2 and 3. The instantaneous release, complete or partial, is effected by turning operating rod 74 on its pivot while the holding and tripping member 76 is in the position shown in the drawing, that is, with the weighted end 79 resting on the pawl. The graduated release is effected by reversing the holding and tripping member so that its tailpiece bears against the projection 81 of the pawl. The pressure of the brakes may then be relieved gradually (or all at once of course if desired) by first turning the handwheel, here designated 82, slightly in the brake-setting direction to relieve the bind between tooth 68 and the ratchet wheel.

Figure 6:
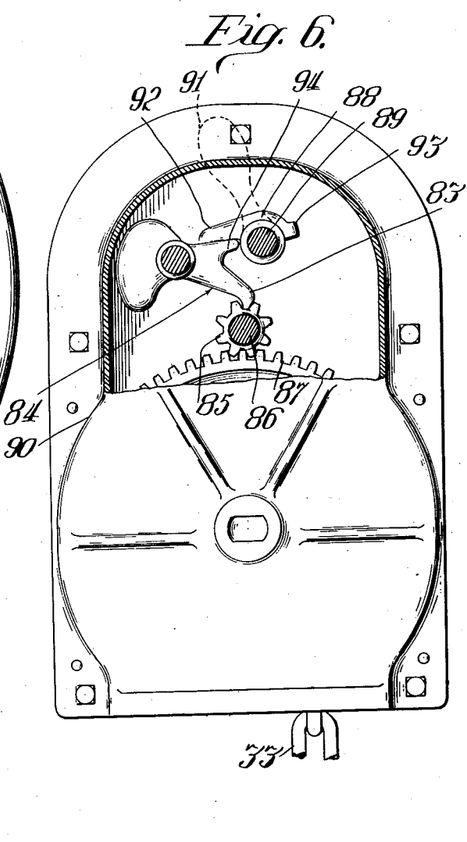
Fig. 6 is a vertical sectional view showing another embodiment of the invention in which the holding pawl or detent engages directly with the pinion for operating the winding drum.

In Fig. 6 the ratchet wheel is omitted. The nosepiece 83 of pawl 84 engages with the teeth of the small pinion 85 on the handwheel shaft 86, which pinion engages with the large gear 87 on the winding drum. The tripping and holding member 88 pivoted at 89 within the housing 90 is provided outside of the housing with an operating lever 91. The tripping and holding member has a nosepiece 92 normally bearing against the pawl 84. By swinging operating lever 91 to the right and tailpiece 93 of the holding and tripping member is brought to bear against the underside of a lug 94 on the pawl for graduated release. Instantaneous release can be effected by forcibly moving the operating lever to the right.

Figure 7:
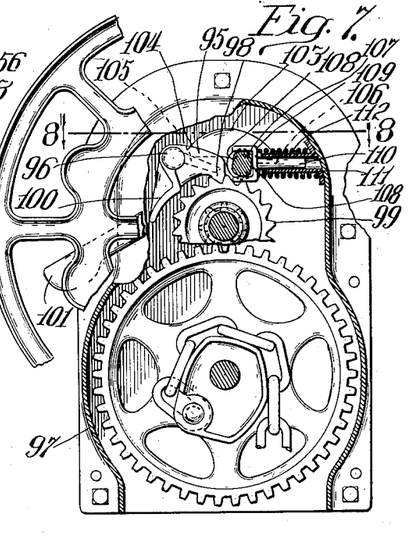
Fig. 7 illustrates, by a fragmentary vertical sectional elevation, another modification in which a spring is substituted for a weight in the tripping mechanism.
Figure 8:
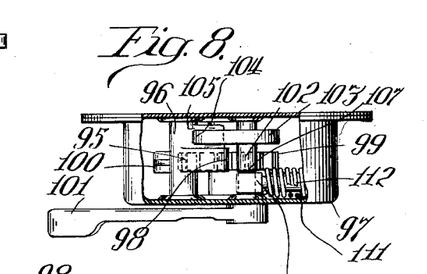
Fig. 8 is a horizontal sectional view on line 8—8 of Fig. 7.
Figure 9:
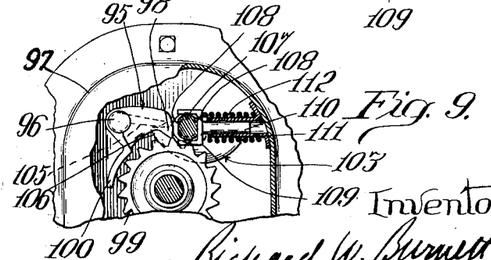
Fig. 9 is a detail view in side elevation of the ratchet, pawl and holding and tripping member of Figs. 7 and 8 with the holding and tripping member reversed, but before the pawl has reached its normal releasing position.

In Figs. 7, 8 and 9 a tripping and holding mechanism is shown in which a spring is substituted for the weighted element of the previously described embodiments of the invention.

The pawl 95 is carried on a rockshaft 96 within the housing 97. The pawl is formed with a tooth or nosepiece 98 adapted to engage the ratchet wheel 99. It is also provided with a tailpiece 100 which acts as a stop and also as a brake through its engagement with the ratchet wheel. The operating lever 101 is arranged outside of the housing 97 between the housing and hand wheel and is secured to a rockshaft 102 extending through the housing. On this rockshaft is fixed a holding and tripping member 103, one end 104 of which is adapted to bear upon the upper surface of a web 105 on the pawl, the other end 106 engages the under surface of web 105 when the operating lever 101 is turned approximately 180° to the right from its position as shown in Fig. 7. By forcing the operating lever downwardly at the end of its movement to the right the nosepiece 98 of the pawl 95 can be disengaged from the ratchet wheel 99 against the braking pressure existing between these two elements. Or if the operating lever is turned so as to merely bring the holding and tripping member 103 against the under surface of web 105 the brakes may be released by relieving the pressure between the pawl and ratchet by slight movement of the handwheel in the brake-setting direction. The shaft 102 has a section 107 with opposite flat sides 108 which lies within a yoke 109 on a spindle 110 that extends within a tubular guide 111 projecting from the inner wall of the housing 97, a coiled spring 112 being interposed between the housing and the yoke. When the operating lever 101 is moved from left to right or right to left one flat side 108 of the portion 107 of shaft 102 is aligned, approximately, with the inner back surface of the yoke. Preferably, however, the alignment is not quite complete when lever 101 is moved to the extreme left position, said surface 108 being slightly oblique, as shown, with respect to the inner surface of the yoke when the lever 101 reaches its normal pawl releasing position, one of said surfaces 108 aligns with the inner face of the yoke. The spring 112, therefore, exerts a pressure on the yoke and on shaft 102 which resists any tendency of the shaft to revolve.

Figure 10:
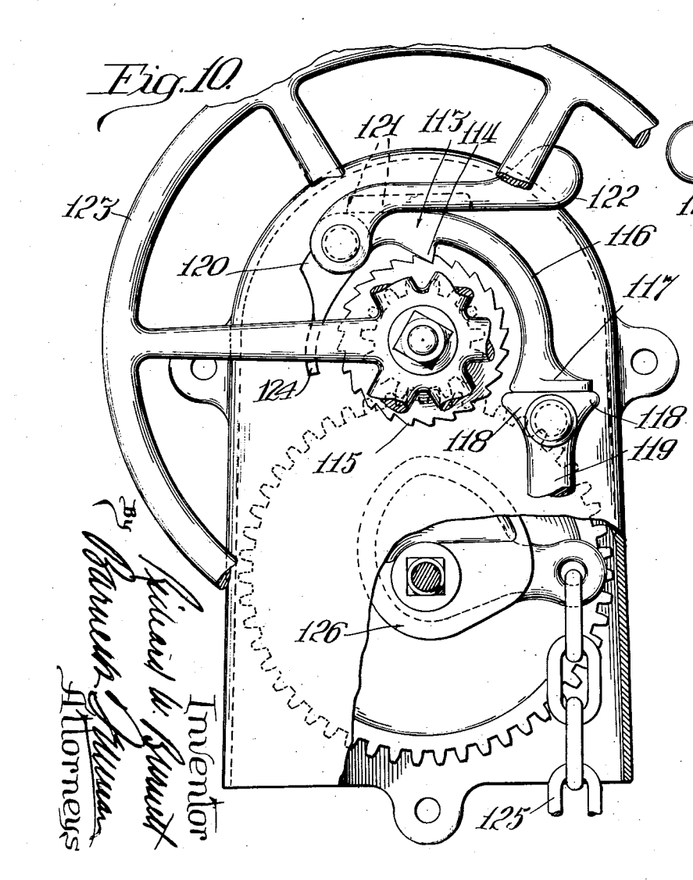
Fig. 10 is a view similar to Fig. 5 showing another modification.
Figure 11:
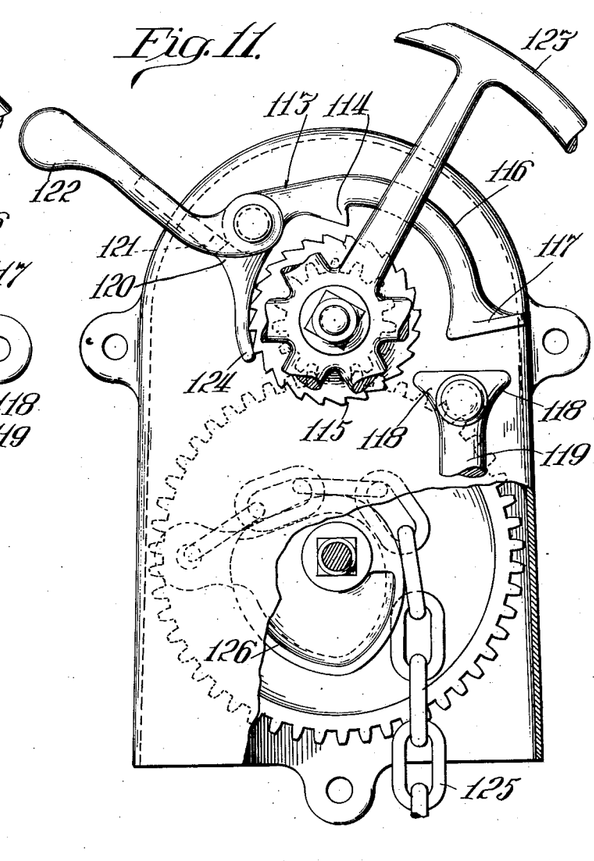
Fig. 11 is a view of the same mechanism with the parts in different positions.

Figs. 10 and 11 illustrate a holding and releasing mechanism in which the pawl and holding and a relatively long tripping member are pivoted on the same axis with the trip lever operating back of the upper portion of the hand wheel.

In Figs. 10 and 11 the pawl 113 is formed with a tooth 114 to engage the ratchet wheel 115, with an arcuate portion 116 terminating in a foot 117 for engagement by the cams 118, 118 on the releasing rod 119, and also with a stop lug 120 adapted to be engaged by an abutment 121 on the holding and tripping member 122. The latter in its holding position bears against the top of the pawl 113.

Fig. 10 shows the parts of the mechanism in their normal positions. The brakes are set by revolving the handwheel 123 in the clockwise direction. For instantaneous release operating rod 119 is swung to the right or left. For the graduated release the holding and tripping member 122 is turned from the right to the left (Fig. 10) until shoulder 121 bears against lug 120. The handwheel is then turned clockwise to relieve the pressure between the ratchet wheel and pawl. The pawl is tilted upwardly, bringing about a disengagement between its tooth 114 and the ratchet wheel 115, the tailpiece 124 of the pawl coming into contact with the ratchet wheel so as to limit further movements of rotation in that direction of the pawl and of the holding and tripping member. Fig. 11 shows the position of the parts at this instant. The chain 125 is wound upon the winding drum 126 but is about to be unwound therefrom either instantaneously, if the brakeman releases his grasp on the handwheel 127, or to the extent that the brakeman may desire if the release is a control release.

The invention has been illustrated in certain preferred embodiments all based upon the same principles of construction and operation. Other modifications will readily suggest themselves to those familiar with this art. Therefore, it is to be understood that the invention is not to be considered as limited to the particular types of apparatus shown and described, the intention being to cover all equivalent arrangements within the scope of the appended claims. I do not claim herein the housing construction shown, as that is claimed in my copending application Serial No. 329,243 (Patent 1,870,985 dated August 9, 1932;) nor do I claim herein, specifically, the construction shown in Fig. 5, or in Figs. 7 to 9, or in Figs. 10 or 11, as these constructions are specifically claimed in three copending applications all filed Feb. 27, 1930 and bearing serial numbers, respectively, 431,761, (Patent 1,879,977 dated Sept. 27, 1932); 431,762 and 431,763.

I claim:

1. In apparatus for manually operating railway car brakes, the combination of a hand wheel vertically arranged on the car, a shaft connected with said hand wheel, mechanism for holding said shaft in brake setting position and for releasing the same, comprising a ratchet, a pawl for holding the ratchet against reverse movement when the brakes are in set position, means for forcing the pawl from engagement with the ratchet against braking pressure between said elements, and a pivoted member over-weighted at one end for keeping the pawl in engagement with the ratchet.

2. In apparatus for manually operating railway car brakes, the combination of a hand wheel vertically arranged on the car, a shaft connected with said hand wheel, mechanism for holding said shaft in brake setting position and for releasing the same, comprising a ratchet, a pawl for holding the ratchet against reverse movement when the brakes are in set position, a lever for forcing the pawl from engagement with the ratchet against braking pressure between said elements, and a lever which in one position tends to establish and maintain engagement between the pawl and ratchet and in another position to lift and hold the pawl out of its ratchet holding position when the said braking pressure between the pawl and ratchet is relieved.

3. In an apparatus for manually operating railway car brakes, the combination of a hand wheel vertically arranged on the car, a shaft connected with said hand wheel, mechanism for holding said shaft in brake setting position and for releasing the same comprising a ratchet, a pawl engaged with said ratchet to hold the same against reverse movement, a lever provided with a cam to bear against said pawl for disengaging the same from the ratchet, and a pivoted member overweighted at one end which tends to keep the pawl in engagement with the ratchet.

4. In apparatus for manually operating railway car brakes, the combination of a hand wheel vertically arranged on the car, a shaft connected with said hand wheel, mechanism for holding the shaft in brake setting position and for forcibly releasing the same comprising a ratchet on the shaft, a pawl engaging the ratchet, a lever provided with a cam to bear against said pawl for disengaging the same from the ratchet, and a member which in one position tends to establish and maintain engagement between the pawl and ratchet and in another position to automatically lift and hold the pawl in a position free of the ratchet upon release of the braking pressure on said pawl.

5. In apparatus for manually operating railway car brakes, the combination of a hand wheel vertically arranged on the car, a shaft connected with said hand wheel, mechanism for holding said shaft in its brake setting position and for forcibly releasing the same, comprising a ratchet, a pawl engaged with the ratchet to hold the same against reverse movement, a lever provided with a cam to bear against said pawl for disengaging the same from the ratchet, and a member pivoted on a separate axis from the pawl overweighted at one end which tends to keep the pawl in engagement with the ratchet.

6. In apparatus for manually operating railway car brakes, the combination of a hand wheel vertically arranged on the car, a shaft connected with the hand wheel, mechanism for holding said shaft in its brake setting position and for forcibly releasing the same comprising a ratchet, a pawl engaged with the ratchet to hold the ratchet against reverse movement, a lever pivoted on a different axis from the pawl engageable therewith to disengage the ratchet from the pawl, and a member which in one position tends to establish and maintain engagement between the pawl and ratchet and in another position to lift and hold the pawl out of its ratchet holding position when the braking pressure between the pawl and ratchet is relieved.

7. In apparatus for manually operating railway car brakes, the combination of a hand wheel vertically arranged on the car, a shaft connected with the hand wheel, and mechanism for holding said shaft in brake setting position and for releasing the same, comprising two normally engaged elements and an operating rod pivoted to hang in a vertical position provided with means for separating the aforesaid elements when the rod is turned to an oblique position.

8. In apparatus for manually operating railway car brakes, the combination of a hand wheel vertically arranged on the car, a shaft connected with the hand wheel, mechanism for holding said shaft in its brake setting position and for forcibly releasing the same comprising a ratchet, a pawl for holding the ratchet against reverse movement when said shaft is in brake setting position, an operating rod pivoted to hang in a vertical position and provided with a cam adapted to bear against the pawl and to disengage it from the ratchet when the rod is turned to an oblique position, and a member which tends to keep the pawl in engagement with the ratchet.

9. In apparatus for manually operating railway car brakes, the combination of a hand wheel vertically arranged on the car, a shaft connected with the hand wheel, mechanism for holding said shaft in its brake setting position and for forcibly releasing the same comprising a ratchet, a pawl for holding the ratchet against reverse movement when the said shaft is in brake setting position, an operating rod pivoted to hang in a vertical position and provided with a cam adapted to bear against the pawl and to disengage it from the ratchet when the rod is turned to an oblique position, and a member which in one position tends to establish and maintain engagement between the pawl and ratchet and in another position to lift and hold the pawl to a position free of the ratchet when the braking pressure between the pawl and ratchet is relieved.

10. In apparatus for manually operating railway car brakes, the combination of a hand wheel vertically arranged on the car, a shaft connected with the hand wheel, mechanism for holding said shaft in its brake setting position and for forcibly releasing the same comprising a ratchet in rigid relation with said shaft, a substantially horizontally disposed pawl movable in a vertical plane to engage said ratchet and having a forward projection and a tailpiece, a pivoted holding and tripping member overweighted at one end adapted in one position to engage with its overweighted end the upper surface of the forward projection of the pawl and in another position to engage with its other end, the under surface of said forward projection, and a vertically disposed pivoted rod provided with a cam adapted to engage the tailpiece of a pawl to disengage the pawl from the ratchet when said rod is turned to an oblique position.

11. In apparatus for manually operating railway car brakes, the combination of a hand wheel vertically arranged on the car, a shaft connected with the hand wheel, mechanism for holding said shaft in brake setting position and for forcibly releasing the same comprising a ratchet, a pivoted pawl and a pawl tripping lever pivoted on a different axis from the pawl to operate back of the upper portion of the hand wheel and adapted to engage the pawl at a location intermediate the axis of the pawl and the axis of the lever, said lever being adapted in one position to hold the pawl in engagement with the ratchet and in another position to hold it out of engagement with the ratchet.

12. In apparatus for manually operating railway car hand brakes, the combination of a vertically disposed hand wheel, a shaft connected with the hand wheel, mechanism for holding said shaft in its brake setting position and for forcibly releasing the same comprising a ratchet, a pawl for engaging the ratchet to hold said shaft in the brake setting position, all arranged on a vertical wall of the car, and a trip lever pivoted intermediate its ends on said wall and projecting upwardly from said apparatus toward the roof and downwardly toward the ground for disengaging the pawl from the ratchet.

13. In apparatus for manually operating railway car brakes, the combination of a hand wheel vertically arranged on the car, a shaft connected with the hand wheel, co-engaging holding elements for maintaining the said shaft in brake setting position, and mechanism which can be set to automatically bring about the release of said holding elements when the hand wheel is turned to relieve the braking pressure between the same comprising a hand lever pivoted to swing in an arc back of the upper portion of the hand wheel for exerting a multiplied force against one of said holding elements and manually operable to disengage said elements against the stress of the braking pressure.

14. In apparatus for manually operating railway car brakes, the combination of a hand wheel vertically arranged on the car, a ratchet and pawl for maintaining the hand wheel in brake setting position, and mechanism which can be set to automatically move said pawl to a position free of the said ratchet when the hand wheel is turned to relieve the braking pressure between the same comprising a hand lever pivoted to swing in a plane parallel to and back of the upper portion of the hand wheel for exerting a multiplied force against said pawl and manually operable to disengage the pawl from the ratchet against the stress of the braking pressure.

15. In apparatus for manually operating railway car brakes, the combination of a vertically arranged hand wheel on the car, a shaft connected with the hand wheel, a ratchet and pawl for maintaining the shaft in brake setting position, and mechanism which can be set to automatically move the pawl to a position free of the ratchet when the hand wheel is turned to relieve the braking pressure between the same comprising a hand lever pivoted to swing in an arc back of the upper portion of the hand wheel for exerting a multiplied force against said pawl tending to lift the pawl from the ratchet and adapted to be manually operated to forcibly disengage the pawl from the ratchet against the stress of the braking pressure.

16. In apparatus for manually operating railway car brakes, the combination of a hand wheel vertically arranged on the car, holding elements for maintaining the hand wheel in brake setting position, and mechanism which can be set either to automatically bring about the release of said holding elements when the hand wheel is turned to relieve the braking pressure between the same, or to bring said holding elements into engagement after having been disengaged, comprising a hand lever pivoted back of the upper portion of the hand wheel for exerting a multiplied force against one of said holding elements and adapted to be manually operated to forcibly disengage said elements against the stress of the braking pressure.

17. In apparatus for manually operating railway car brakes, the combination of a vertically arranged hand wheel on the car, a shaft connected with the hand wheel, holding elements for maintaining the shaft in brake setting position, and mechanism which can be set either to automatically bring about the release of said holding elements when the hand wheel is turned to relieve the braking pressure between the same, or to bring said holding elements into engagement after having been disengaged, comprising a hand lever operable back of the upper portion of the hand wheel for exerting a multiplied force against one of said holding elements and manually operable to forcibly disengage said elements against the stress of the braking pressure.

18. In apparatus for manually operating railway car brakes, the combination of a hand wheel vertically arranged on the car, a shaft connected with said hand wheel, means for holding said shaft in the brake setting position and for forcibly releasing the same against the stress of the braking pressure, comprising a hand lever arranged substantially parallel with the hand wheel, a free end of which extends substantially to the rim of the hand wheel.

19. In apparatus for manually operating railway car brakes, the combination of a hand wheel vertically arranged on the car, a shaft connected with said hand wheel, means for holding said shaft in the brake setting position and for forcibly releasing the same against the stress of the braking pressure, comprising a hand lever arranged between the hand wheel and car, a free end of which extends substantially to the rim of the hand wheel.

20. In apparatus for manually operating railway car brakes, the combination of a hand wheel vertically arranged on the car, a shaft connected with said hand wheel, means for holding said shaft in the brake setting position arranged adjacent the axis of the hand wheel, and means for forcibly releasing the holding mechanism against the stress of braking pressure comprising a hand lever, a free end of which extends substantially to the rim of the hand wheel.

21. In apparatus for manually operating railway car brakes, the combination of a hand wheel vertically arranged on the car, a shaft connected with said hand wheel, mechanism for holding the shaft in the brake setting position comprising a ratchet and detent, and a power multiplying lever for forcing the detent out of engagement with the ratchet against braking pressure, a free end of which lever extends substantially to the rim of the wheel.

22. In apparatus for manually operating railway car brakes, the combination of a hand wheel vertically arranged on the car, a shaft connected with the said hand wheel, a ratchet and detent arranged adjacent the axis of the hand wheel for holding said shaft in brake setting position, and a power multiplying lever adapted to be set to permit automatic disengagement of said detent when the hand wheel is turned in a brake setting direction and manually operable for forcibly releasing said shaft against braking pressure, a free end of which lever extends substantially to the rim of the hand wheel.

23. In apparatus for manually operating railway car brakes, the combination of a hand wheel vertically arranged on the car, mechanism for holding said hand wheel in the brake setting position which may be set so as to automatically release said hand wheel for reverse movement when the hand wheel is rotated in a direction to increase the braking pressure, said mechanism comprising a power multiplying lever arranged back of the hand wheel for forcibly releasing said hand wheel against braking pressure.

24. In apparatus for manually operating railway car brakes, the combination of a hand wheel vertically arranged on the car, and holding mechanism for holding said hand wheel in the brake setting position and including a releasing lever for forcibly releasing the hand wheel against braking pressure arranged adjacent said hand wheel.

25. In apparatus for manually operating railway car brakes, the combination of a hand wheel vertically arranged on the car, a ratchet and detent for holding said hand wheel in the brake setting position and a power multiplying lever arranged adjacent said hand wheel for forcibly disengaging the detent from the ratchet against braking pressure.

26. In apparatus for manually operating railway car brakes the combination of a hand wheel vertically arranged on the car, a shaft connected with said hand wheel, a ratchet on said shaft, a pivoted detent to engage said ratchet and a lever for forcibly disengaging the detent from the ratchet against braking pressure.

27. In apparatus for manually operating railway car brakes, the combination of a hand wheel vertically arranged on the car, a shaft connected with said hand wheel, a ratchet on said shaft, a detent to engage said ratchet and a power multiplying lever pivoted on an axis different from the axis of the detent for forcibly disengaging the detent from the ratchet against braking pressure.

28. In apparatus for manually operating railway car brakes the combination of a hand wheel vertically arranged on the car, a shaft connected with the hand wheel, a ratchet on said shaft, a detent to engage said ratchet and a power multiplying lever for forcibly disengaging the detent from the ratchet against braking pressure which may be set to automatically disengage said detent from the ratchet when the hand wheel is rotated in the brake setting direction.

29. In apparatus for manually operating railway car brakes the combination of a hand wheel vertically arranged on the car, a ratchet wheel rigid with said hand wheel, a pivoted detent to engage said ratchet, and a power multiplying lever arranged adjacent said hand wheel and for forcibly disengaging said detent from the ratchet against braking pressure.

30. In apparatus for manually operating railway car brakes the combination of a hand wheel vertically arranged on the car, a ratchet wheel rigid with said hand wheel, a pivoted detent to engage said ratchet and a power multiplying lever arranged adjacent said hand wheel and pivoted on an axis different from the axis of the detent for forcibly disengaging said detent from the ratchet against braking pressure.

31. In apparatus for manually operating railway car brakes the combination of a hand wheel vertically arranged on the car, a shaft connected with the hand wheel, holding and releasing mechanism for said shaft which may be set to automatically release the shaft when the hand wheel is moved in the brake setting direction which comprises a power multiplying lever for forcibly releasing said shaft against braking pressure.

32. In apparatus for manually operating railway car brakes the combination of a hand wheel vertically arranged on the car, a ratchet wheel rigid with said hand wheel, a pivoted detent to engage said ratchet, and a tripping device which in one position tends to disengage the detent from the ratchet and in the other to hold same in engagement therewith, comprising a power multiplying lever for forcibly disengaging said detent from the ratchet against braking pressure.

33. Holding and releasing mechanism for railway car hand brakes comprising a vertically arranged ratchet wheel, a detent to engage the same pivoted on an axis fixed with respect to the car body to oscillate freely in a vertical plane to prevent reverse movement of the ratchet, a manually operated element for setting the brakes having a positive connection with said ratchet wheel, a tripping device provided with a power multiplying lever by movement of which in one direction the tripping device may be brought against the detent to force it out of engagement with the ratchet wheel against the braking pressure, said lever and tripping member being adapted to be set to a position which will automatically disengage the detent from said ratchet wheel when the manually operated element is moved in a direction to relieve the braking pressure between said detent and ratchet wheel.

34. In apparatus for manually operating a railway car brake, the combination of a hand wheel vertically arranged on the car, a shaft connected with said hand wheel, means for holding said shaft against reverse movement comprising a ratchet and a pawl, a power multiplying hand lever movable to one position to exert force on the pawl near its pivotal axis to hold the pawl in engagement with said ratchet, and movable to another position to forcibly release the shaft from its engagement with the holding means, said lever in its second position also being adapted to cause automatic release of said pawl when the hand wheel is turned in the brake setting direction.

35. In apparatus for manually operating a railway car brake, the combination of a hand wheel vertically arranged on the car, a shaft connected with said hand wheel, means for holding the mechanism in brake setting position including a pivoted holding pawl adapted, when in its holding position, to prevent reverse movement of the said shaft, means for releasing the shaft from its brake setting position comprising a lever manually operable to release the pawl from its holding position against the brake setting pressure exerted through said shaft, and a counterweight member movable, independently of the movements of said lever, into engagement with the pawl to hold it, when released by said lever, in its released position.

36. In apparatus for manually operating a railway car brake, the combination of a hand wheel vertically arranged on the car, a shaft connected with said hand wheel, a pivoted holding pawl automatically movable into position to prevent movement of the shaft in one direction, means for releasing said shaft from its brake setting position comprising a lever pivoted on a separate axis from the pawl and positioned to exert leverage on the pawl at a point remote from its pivotal axis to move it out of its holding position, and a weight member movable into engagement with the pawl to hold it, when released by said lever, out of said holding position.

RICHARD W. BURNETT.